(12) United States Patent
Heidel

(10) Patent No.: US 7,190,088 B2
(45) Date of Patent: Mar. 13, 2007

(54) PROCESS OF USING HYDRAULIC TURBINES TO GENERATE ELECTRICITY

(75) Inventor: Robert Eric Heidel, 896 W. Outer Dr., Oak Ridge, TN (US) 37830

(73) Assignee: Robert Eric Heidel, Oak Ridge, TN (US)

( * ) Notice: Subject to any disclaimer, the term of this patent is extended or adjusted under 35 U.S.C. 154(b) by 454 days.

(21) Appl. No.: 10/701,705

(22) Filed: May 7, 2004

(65) Prior Publication Data

US 2005/0248161 A1    Nov. 10, 2005

(51) Int. Cl.
H02P 9/04    (2006.01)

(52) U.S. Cl. .............................. 290/54; 290/52; 290/43; 415/109; 415/118; 415/201

(58) Field of Classification Search .................. 290/54, 290/52, 43; 415/109, 118, 201
See application file for complete search history.

(56) References Cited

U.S. PATENT DOCUMENTS

| | | | |
|---|---|---|---|
| 429,833 A | | 6/1890 | Nantz |
| 1,345,022 A * | | 6/1920 | Dew .......................... 415/4.3 |
| 4,246,753 A * | | 1/1981 | Redmond .................... 60/398 |
| 4,352,025 A * | | 9/1982 | Troyen ........................ 290/54 |
| 4,392,063 A * | | 7/1983 | Lindquist .................... 290/54 |
| 4,731,545 A * | | 3/1988 | Lerner et al. ................. 290/54 |
| 4,816,697 A * | | 3/1989 | Nalbandyan et al. ......... 290/54 |
| 6,208,037 B1 * | | 3/2001 | Mayo et al. .................. 290/54 |
| 6,216,463 B1 | | 4/2001 | Stewart |
| 6,472,768 B1 | | 10/2002 | Salls |
| 6,509,652 B2 | | 1/2003 | Yumita |
| 6,559,553 B2 | | 5/2003 | Yumita et al. |
| 6,606,857 B1 | | 8/2003 | Simonds |

OTHER PUBLICATIONS

Encyclopedia Americana International Ed. 1999 vol. 14 p. 646-651 vol. 27 p. 239-243 Grolier: Danbury.

* cited by examiner

Primary Examiner—Darren Schuberg
Assistant Examiner—Iraj A. Mohandesi

(57) ABSTRACT

The process of attaching turbines to water mains, water towers, sewage lines, aqueducts, and various pipelines so as to capture the kinetic energy of pressurized fluid traveling through these mediums and changing the kinetic energy to electric energy by means of a generator and conducting this new electricity to the nearest power substation by means of a conduction pipe. By consumer demand for utilities such as water and sewage to be taken to and away from homes and businesses, these consumers will be making their own electricity that they will then buy back from the utility companies. With more and more people buying homes and starting businesses, there will be many new utility consumers on top of the already existing consumers, which means that the potential and scope of using the process for making cleanly generated electricity is limitless and universal.

16 Claims, 17 Drawing Sheets

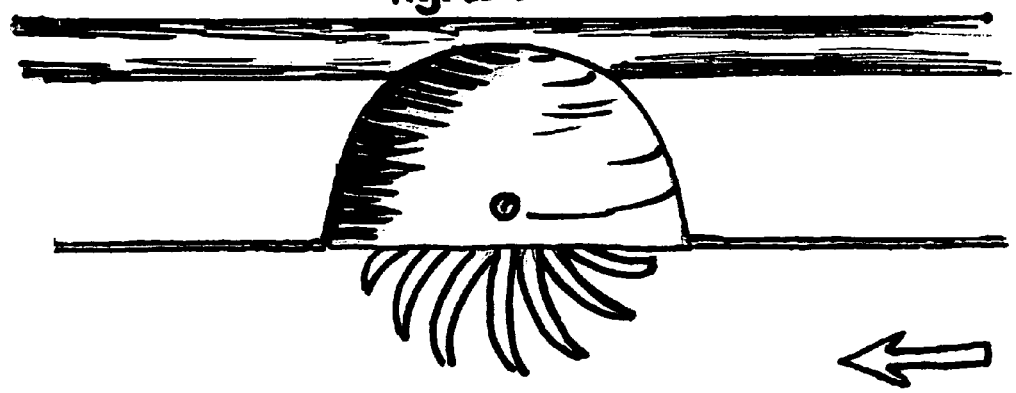
fig. 2a
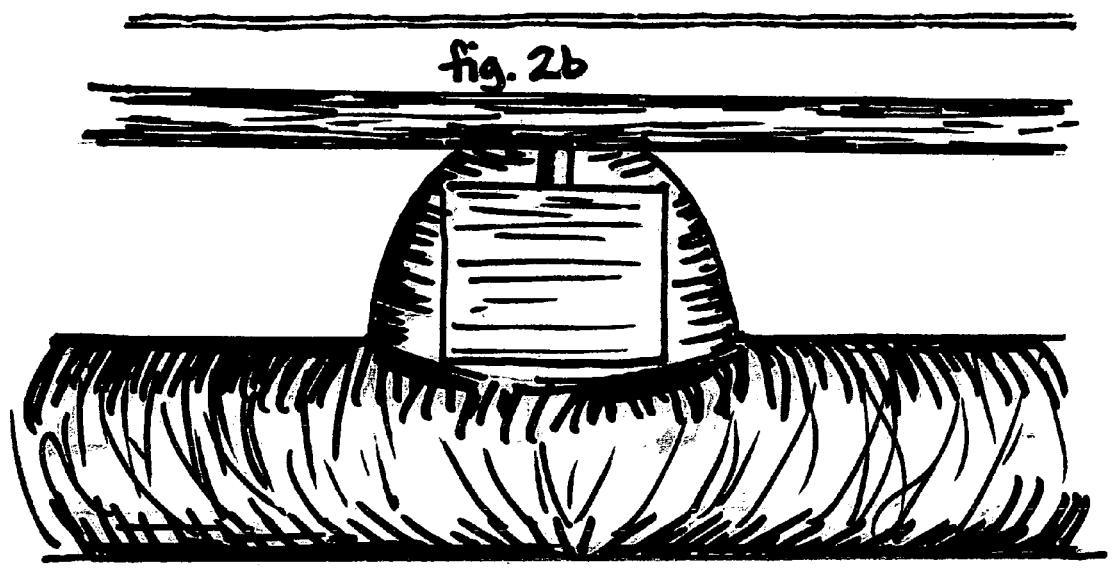
fig. 2b
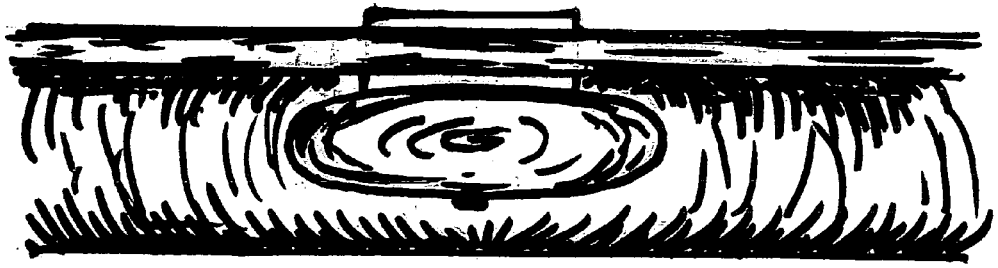
fig. 2c

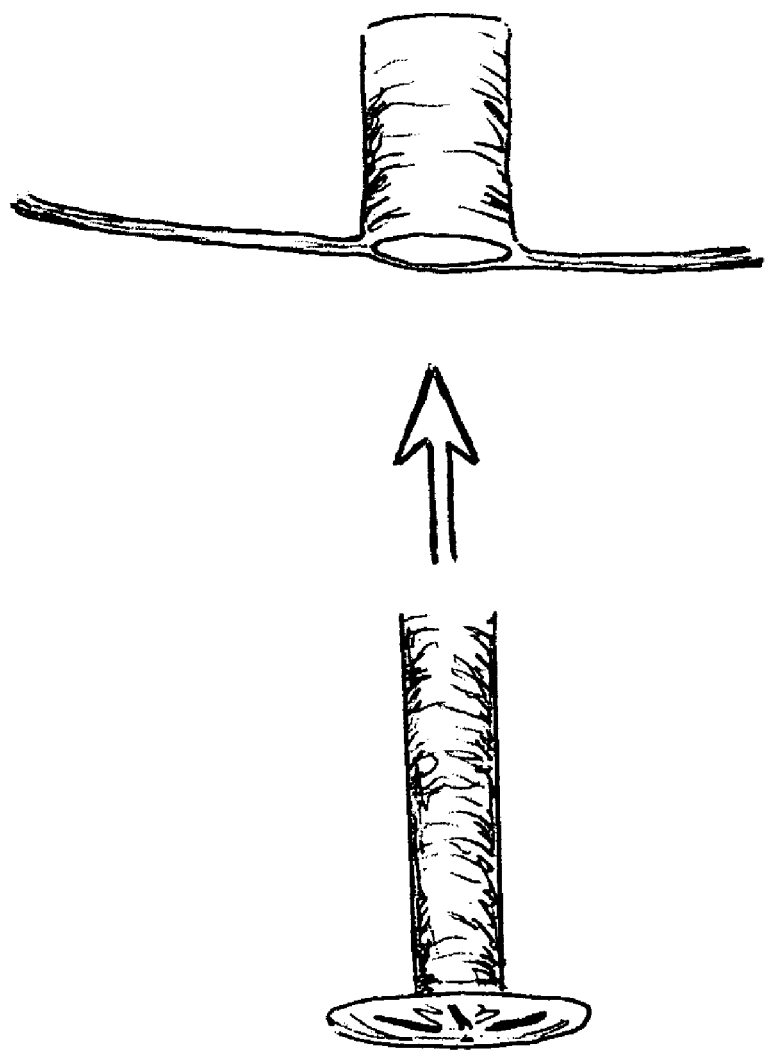

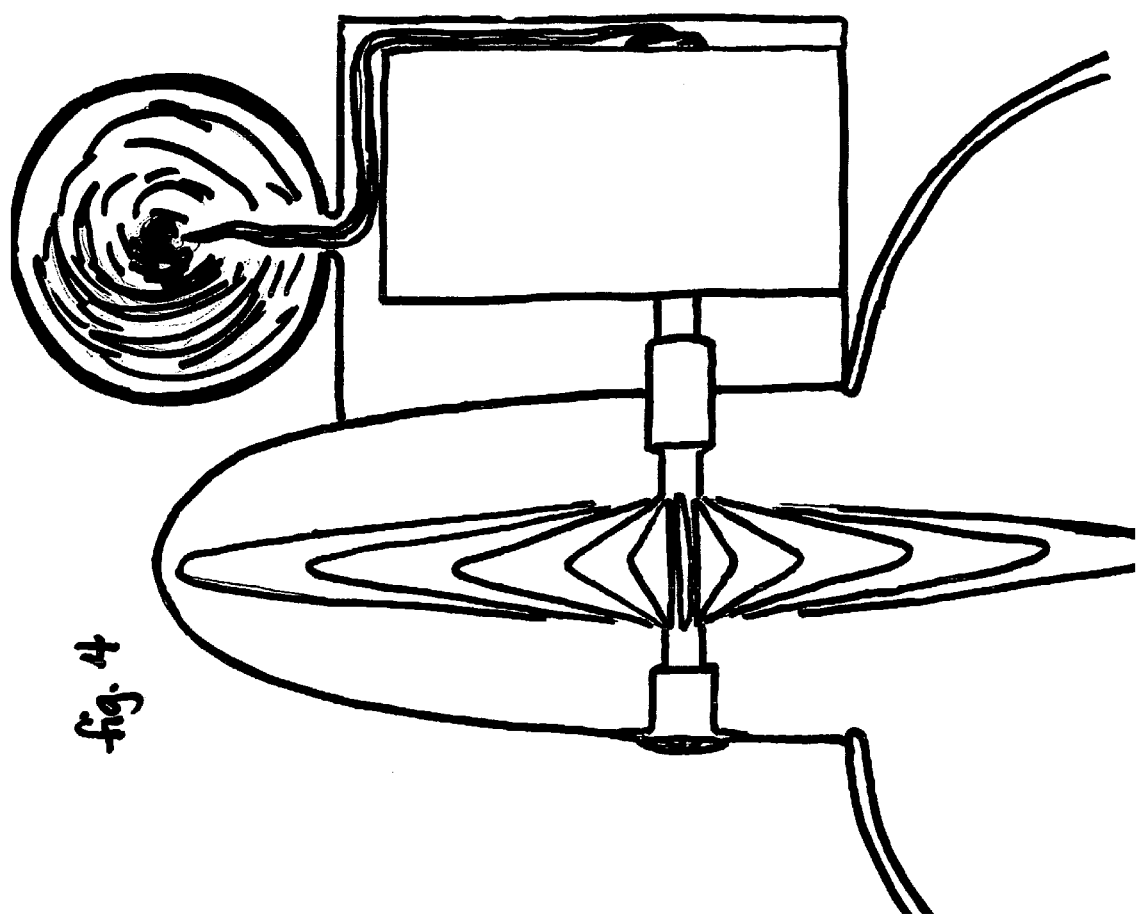

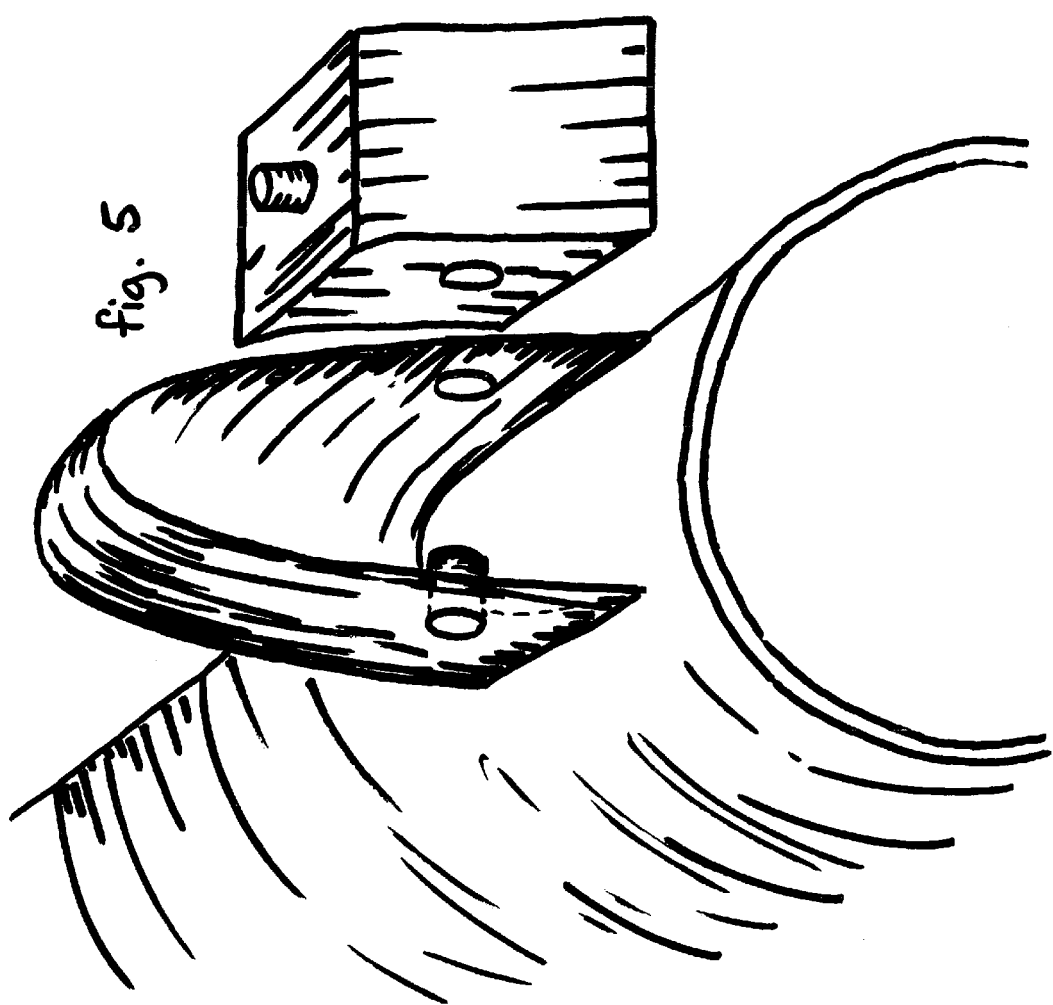

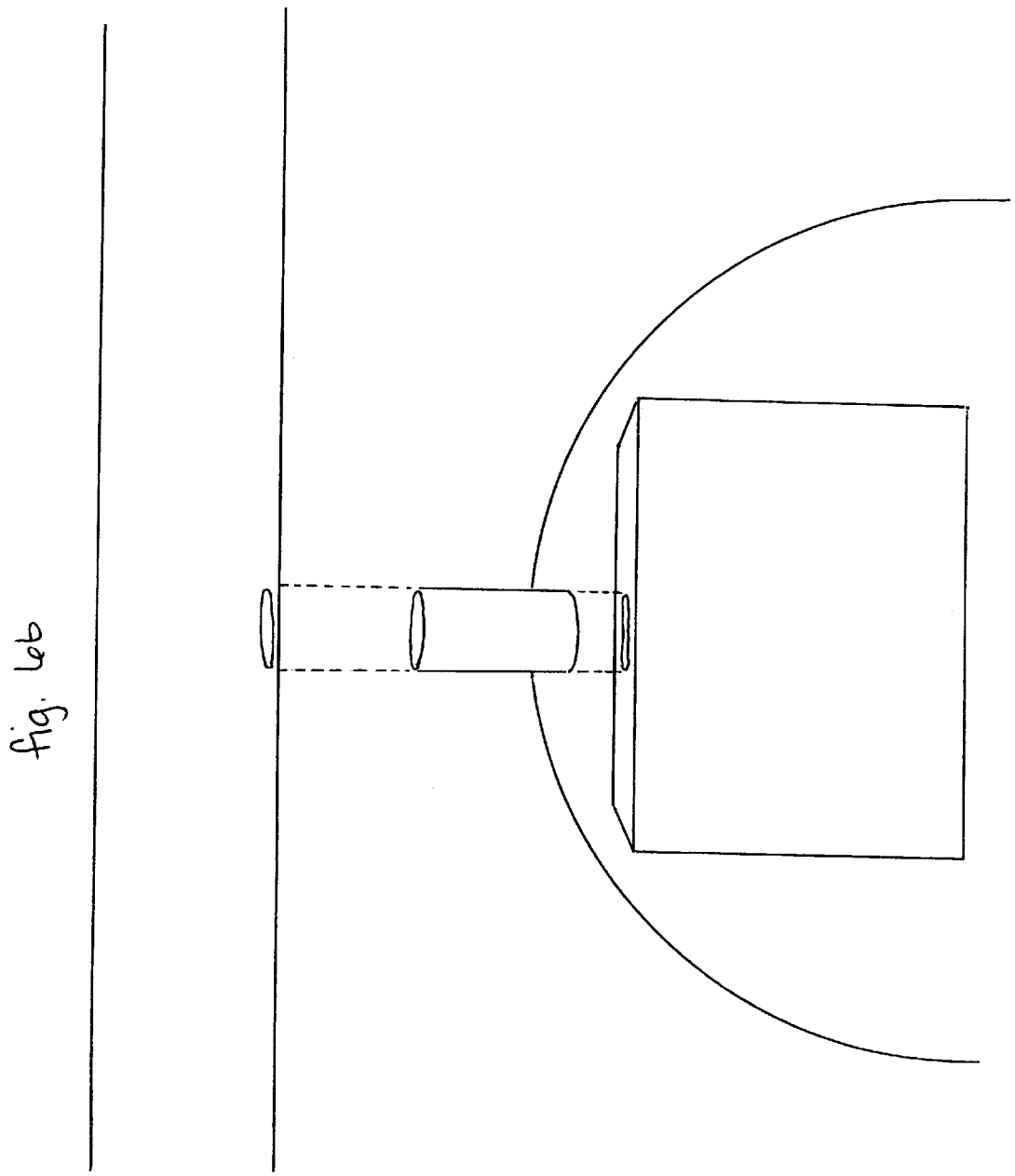

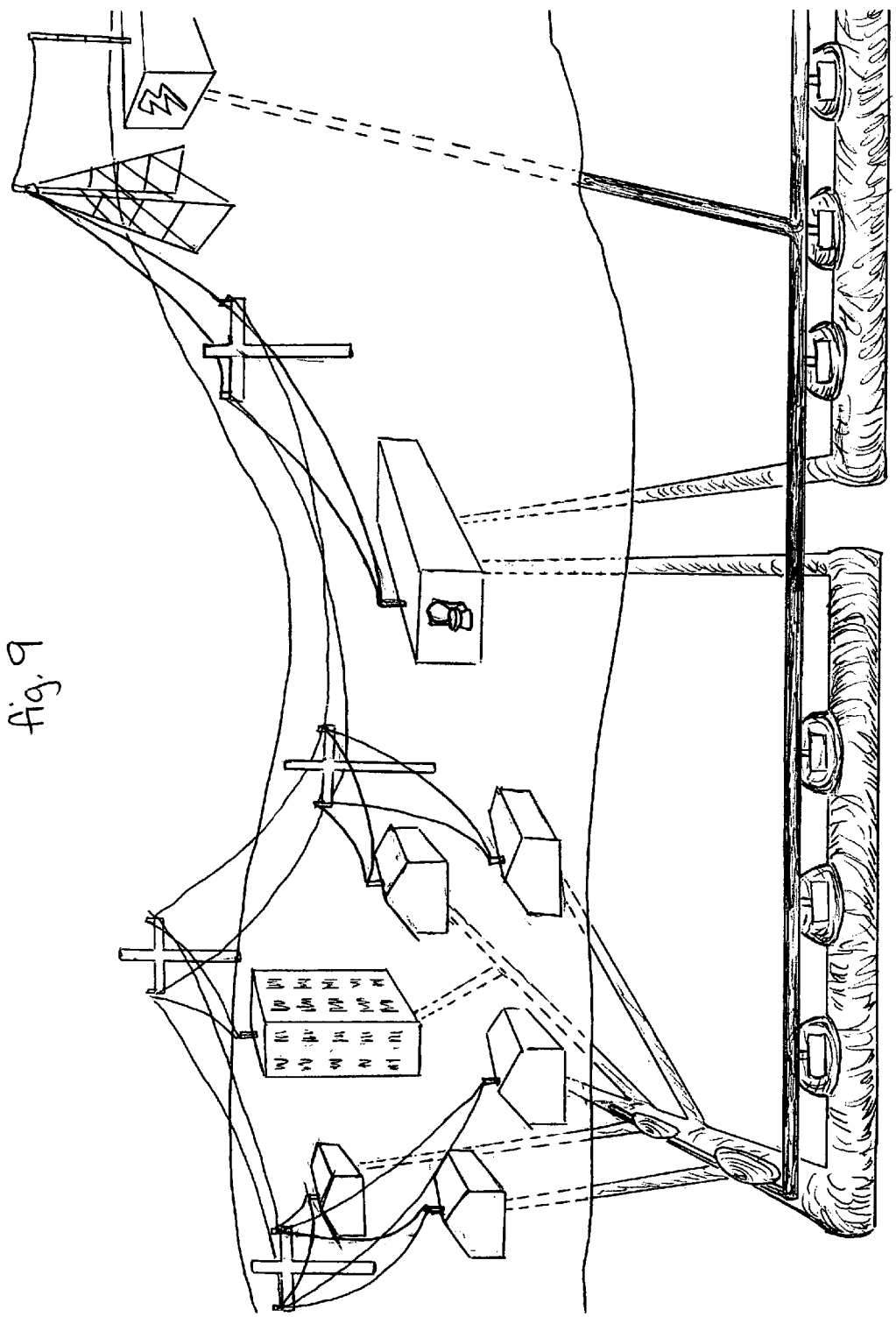

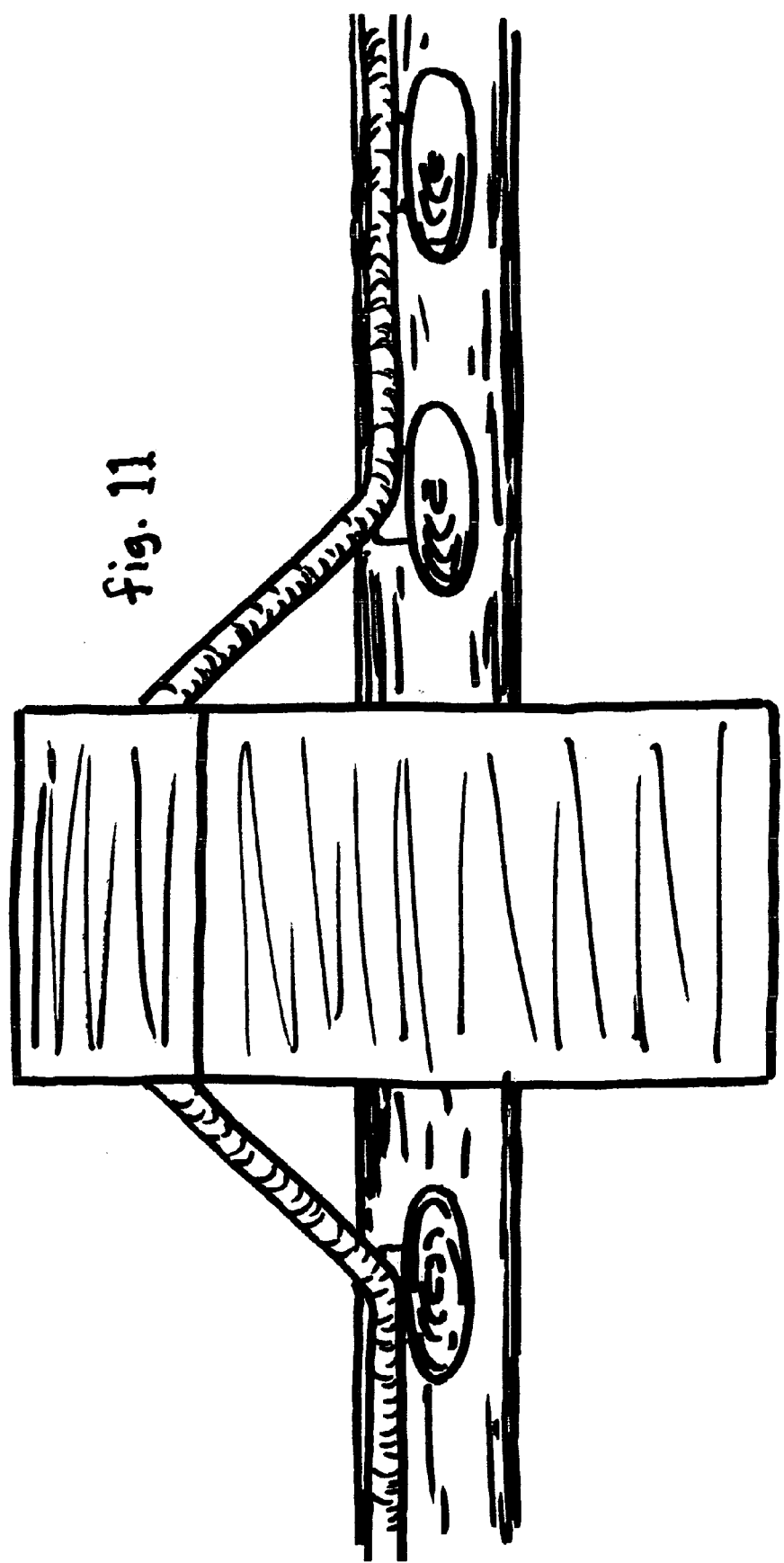

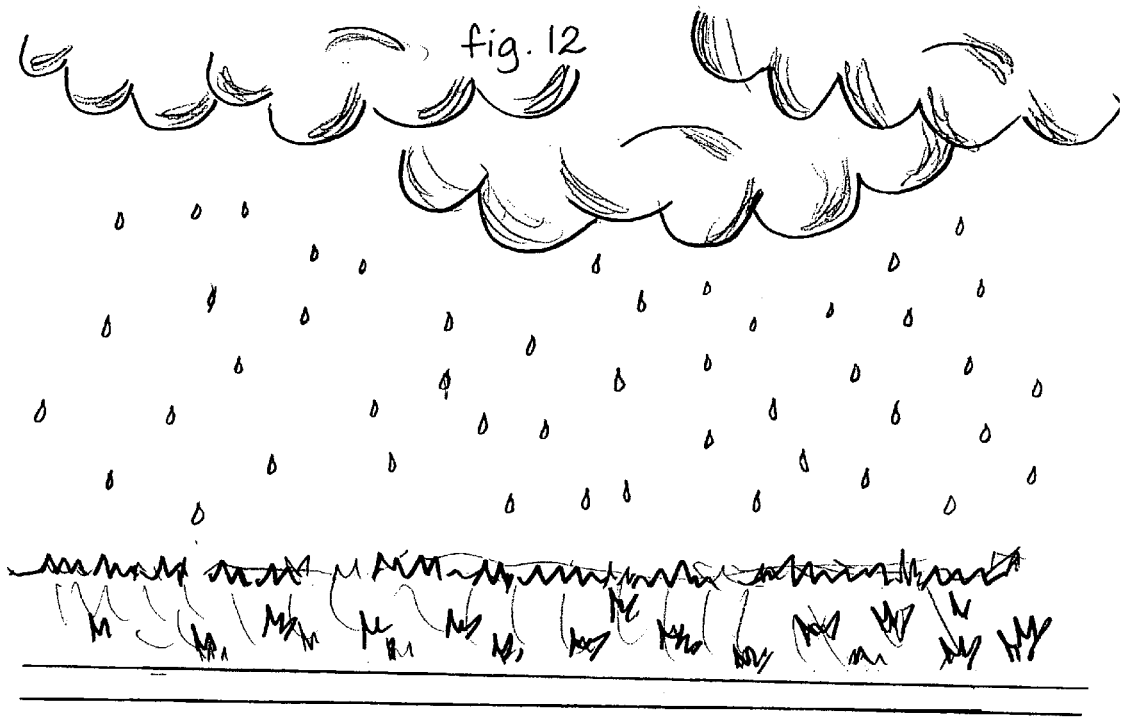
fig. 12
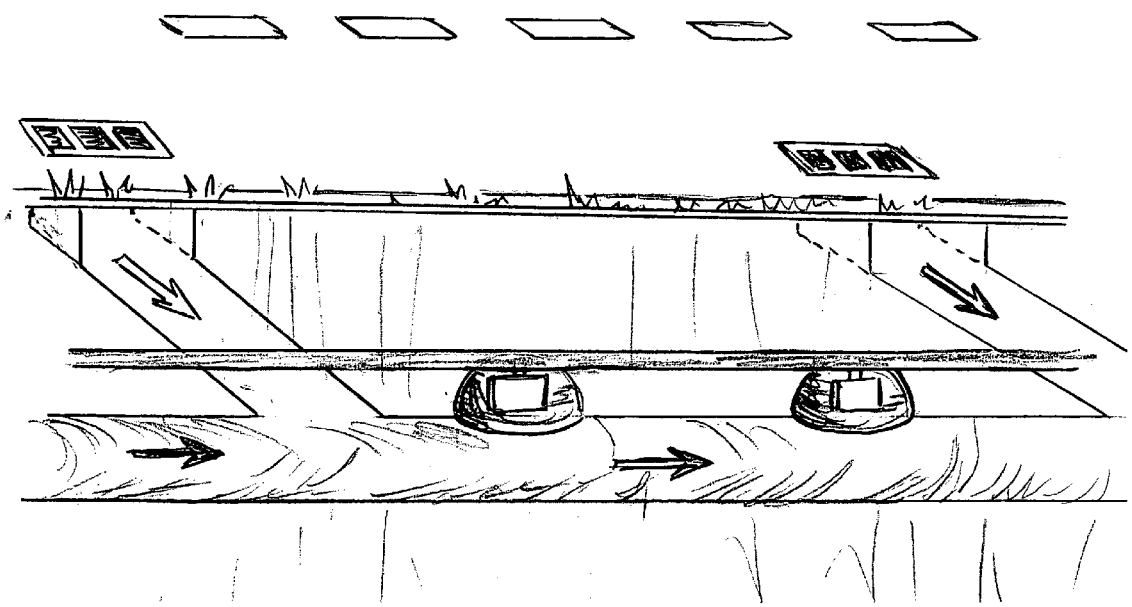

PROCESS OF USING HYDRAULIC TURBINES TO GENERATE ELECTRICITY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The field of endeavor that this process pertains to is the generation of electricity, specifically to the generation of electricity by hydroelectric processes.

2. Background

Electricity is generated for use by society by four different ways. One way is by nuclear reactors. Another way is by gas or steam turning turbines when fossil fuels or water is burned. Wind turbines are popular near deserts and oceans for generating electricity. The fourth way is by hydroelectric means where falling or pressurized water turns a turbine. In the following paragraphs, three of these different processes will be discussed showing the positive aspects of hydroelectric power and the detriments of steam, gas, and nuclear generation of electricity.

Nuclear and gas/steam generation of electricity accounts for 91% of all electricity generated in the United States. These two processes are very detrimental to the environment and the costs are high. When fossil fuels such as coal and gas are burned, harmful substances are released into the atmosphere that damages the air we breathe and the ecosystem that people live in. In the northeast United States, acid rain produced by these chemicals released into the air kills plants and crops. Coal has to be dug out of the earth much like oil that is drilled out of the earth and then sent to a refinery. These processes are costly to businesses and leave scars and holes in the earth. By-products of coal and oil after they have been refined and reprocessed are harmful to the environment and have to be stored which is a costly process. Coal and oil have to be transported to places for use and is a costly expense. Oil spills occur when tankers at sea have accidents and the oil on these ships leaks into the oceans of the world killing the animals that inhabit these oceans. Also these are finite resources that we can never have back when they are gone. Gas and steam generation of electricity creates many problems for the earth and its peoples.

Nuclear processes for generating electricity are harmful as well. The waste created by nuclear power plants has to be treated and stored. The effects on the environment can be devastating if a meltdown was to occur. Human beings and animals exposed to the radiation and by-products of nuclear processes are at a large risk of developing diseases or even dying because of the effect the radiation has on their cells and DNA. Mutations and birth defects in the unborn are other side effects of being exposed to radiation. Bodies of water that have had by-products of nuclear processes dumped into them are no longer able to sustain life or be enjoyed by people. Nuclear generation of electricity is an unsound practice that affects the people who live on earth.

One can say that there are only two ways to generate electricity by clean and natural means, wind and hydroelectric. Only 9% of all electricity created in the United States is by hydroelectric processes. All one needs is water falling from a higher elevation to a lower elevation and you have enough kinetic energy to make large amounts of electricity. Rivers, lakes, and other large bodies of water are dammed up at intervals and these dams create reservoirs of water. During times of peak demand for electricity, water is allowed to flow through the dam and the falling water causes turbines to turn and generators turn the kinetic energy of falling water into useable electric power that is then sent to a nearby power substation where the electricity is boosted up so as to be able to travel to distances far away. There are no harmful by-products of this process. The water that flows through the dam either goes somewhere farther down stream or is pumped back up into a reservoir where it can be used again. The environment is not hurt in any way. Water is an abundant resource. Hydroelectric power is a natural process in that rainwater that falls to the earth and collects in a reservoir can then be used to make electricity. Dams are the main source of hydroelectric power, but many other untapped sources of pressurized flowing water can be utilized so as to make the percentage of hydroelectric power produced skyrocket and eventually make the environmentally unsound practices of gas, steam, and nuclear electric generation obsolete.

This is where the process that is being applied for comes into effect. The many water mains, water towers, sewage lines, aqueducts, and pipelines that carry millions and millions of water and sewage to places it needs to go could create tremendous amounts of clean electricity. This process will be more environmentally sound and cause the percentage of hydroelectric power created in the United States to surpass the processes that are detrimental to the earth.

3. Objects and Advantages

Accordingly, this process has many objects and advantages over the traditional way of generating hydroelectric power and they are:

(a) the process uses many other mediums besides dams to generate hydroelectric power such as water mains, water towers, sewage lines, aqueducts, and pipelines;

(b) with millions of gallons of water and sewage flowing through these mediums at any given moment of any given day, the amount of cleanly created electricity that can be generated daily far exceeds any output of electricity from other electric generation process;

(c) many turbines can be placed along the entirety of a water main, water tower, sewage line, aqueduct, or pipeline so as to capture as much kinetic energy as possible at many intervals creating large amounts of electricity;

(d) by consumer demand for utilities such as water and sewage, people will be making their own electricity as these utilities travel to and from their homes and businesses;

(e) these same consumers will then buy back from the same utility company this electricity created by their demand and the expenses of creating and conducting electricity will be cut substantially which means greater profits for these utility companies;

(f) load problems will be nonexistent with the use of this process because as long as people need water in their homes or businesses and sewage taken away from their homes or businesses, just as they need electricity to power things in their homes, these people will be making their own electricity as they pay for the water and sewage that comes to their homes and businesses;

(g) generation problems will also be eliminated with the utilization of the process because all of the turbines that are attached along the entirety of the medium will be turning at any given time when pressurized fluid is flowing through the medium, and as above when people need water and sewage taken to and from their home, chances are they will need electricity in their homes as well;

(h) the improvement of the production and use of hydroelectric power is seen in the use of the process in that only 9% of all the electricity produced and used in the United States is by hydroelectric means and with the process using any or all of the water mains, water towers, sewage lines, aqueducts, and pipelines in our country this percentage would grow exponentially;

(i) aqueducts like the Delaware River Aqueduct that runs 85 miles underground and carries 800 million gallons of water daily to New York City have the possibility to generate large amounts of electricity with this process being installed, the pressure and head of the water that flows through this aqueduct and similar large aqueducts that bring water to large populaces could make enough electric power to power these populaces and the surrounding areas;

(j) there are no harmful side effects to the environment by making electricity by this process;

(k) the use of sewer systems to make electricity which is an untapped resource that has the potential to make enormous amounts of electricity;

(l) the rain water that is collected in the vents that line the streets, highways, and interstates of our nation have the potential to make electricity when large rain storms cause floods on these transportation routes;

(m) in today's sluggish economy where jobs are scarce, the utilization and installation of this process will create thousands of new jobs for unemployed people

SUMMARY

The use of the process will generate much more electricity than gas or nuclear processes because water mains, water towers, sewage lines, aqueducts and pipes are always pumping purified and non-purified water and waste to every part of the United States. Millions and millions of gallons of purified water, non-purified water, and raw sewage are flowing through mains, towers, lines, aqueducts and pipes at any second of any day. Using this constant and powerful source of moving water and sewage, turbines attached to the pipes, mains, towers, aqueducts and lines that carry the water and sewage where it needs to be would generate huge amounts of cleanly created electricity.

Water towers are placed at the highest elevations so as to create the needed amount of pressure to carry water to where it needs to be. These towers would create large amounts of electricity because of the strength of the head as the water falls from a great height. Aqueducts like the Delaware Aqueduct that carries 800 million gallons of water from the Catskill Mountains to New York daily could generate enough electricity to light up New York City for days on end. Turbines attached to sewage lines would use the waste created by the planet's people to generate power that they need in their everyday lives.

Rainwater is collected in vents by the sides of the roads, highways, and interstates throughout our nation to keep these needed transportation routes clear. This rainwater would then create electricity by its natural flow through the pipes and aqueducts that take it wherever it goes. This is the process at its best; the natural and clean creation of electricity by the earth's natural processes of rain, snow, and sleet.

Water is essential to the survival of all human beings. Electricity is needed to heat our homes, cook our foods, and provide illumination to our homes. Water flows to every person who pays their water bill, this flow will create electricity. The person could use the water to cook food or quench their thirst. The waste created by quenching your thirst or feeding your family would then flow to a treatment plant, which would create electricity. After the water or waste is purified, it would flow once again to those who need it, and more electricity would be generated.

By the need of water for survival, these people will be making their own electricity. By the earth's natural process of movement of water through the atmosphere and biosphere, the earth will create its own electricity. This process is all encompassing and would be beneficial to every human being in the United States and would solve any energy crisis that may have been experienced in the past.

BRIEF DESCRIPTION OF THE SEVERAL VIEWS OF THE DRAWINGS

FIGS. 2a–c. These are views from several angles of the turbine housing.

FIGS. 3a–e. These are views of the hollow cylindrical protrusions from the sides of the turbine housing that support the turbine shaft.

FIG. 4. These views are of the generator housing and how it attaches to and works with the turbine and the turbine housing as well as the conduction pipe.

FIG. 5. This view depicts the important hole in the two housings that allow the turbine shaft to enter the second generator housing.

FIGS. 6a–c. These views pertain to the wires and conduction pipe that conduct the electric energy from the generator to the conduction pipe and then on to the power substation.

FIG. 9. This figure is an example of how sewage lines could generate electricity.

FIG. 10. This figure depicts an example of how an aqueduct can produce electricity.

FIG. 11. This figure is an example of how storage units could be installed next to underground water pumping stations at various intervals to cut down on line loss of electricity traveling from the generator to a power substation.

FIG. 12. This figure is an example of how water drains and the pipes that carry rainwater from streets to rivers, lakes, and streams can produce electricity.

DETAILED DESCRIPTION

The process is the use of hydraulic turbines attached to water mains, water towers, sewer lines, aqueducts and various types of pipes to generate electricity by using the pressurized flow of water and sewage through said mains, towers, lines, aqueducts and pipes.

Figure 1:
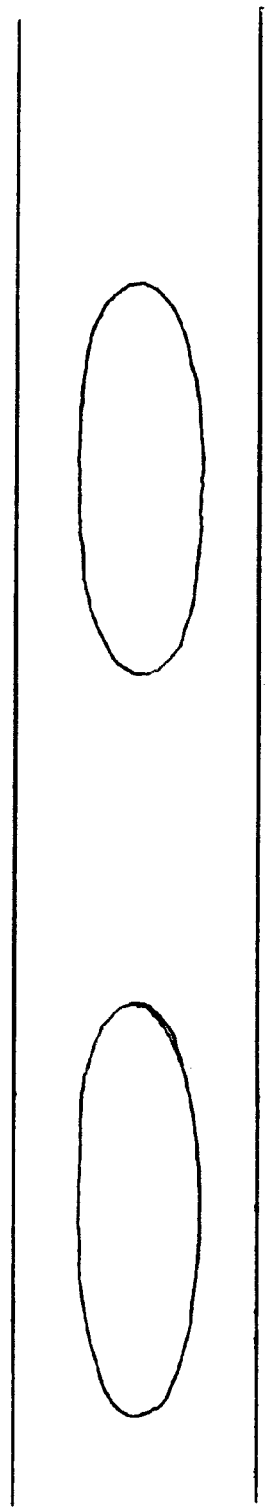
FIG. 1. This is a view of the water main, water tower, sewage line, aqueduct, or pipeline looking down at the openings that the turbine housing will fit into.

FIG. 1 depicts the shape of the holes that are to be cut into the main, tower, line, or pipe. They will be cut on the top side of the main, tower, line, or pipe and will be cut at intervals depending on the amount of head within main, line, tower, or pipe and the amount of electricity that is needed to be produced.

A crescent shaped structure (turbine housing) made of the same material (or some other strong and durable material such as stainless steel) as the main, tower, line, aqueduct or pipe houses the hydraulic turbine and is attached to the main, tower, aqueduct, line, or pipe where the hole is cut. The turbine must be attached to the water main so that no water can escape or leak from the turbine housing.

FIG. 2a shows the crescent shape of the turbine housing from the side where the cylindrical protrusion that holds one side of the turbine shaft is located. The arrow illustrates the pressurized fluid flowing through the main, tower, line, aqueduct, or pipe and also illustrates the positioning of the turbine and the turbine blades so that the blades reach all the way into the center of the main, tower, line, aqueduct, or pipe because this is the point where the fluid velocity is at its greatest and the most kinetic energy can be harnessed. Also the conduction pipe that conducts the new electricity to a power substation can be seen as it is located above and the side of the turbine housing. FIG. 2b depicts the other side of the turbine housing and the how the generator housing will look when attached to the turbine housing. One can also see the connection of the generator housing to the conduction pipe that is important because it will insulate the high voltage wire from the generator as it links into the conduction pipe. Also in this figure one can see how the turbine housing is attached to the main, tower, line, aqueduct, or pipe. FIG. 2c shows the two housings and the conduction pipe from above looking down at the main, tower, line, aqueduct, or pipe. One can see that the turbine housing is attached directly on top of the main, tower, line, or pipe.

The turbine housing houses the hydraulic turbine itself. It is said that maximum efficiency in terms of generation of electricity takes place when the tangential velocity of the turbine is equal to half of the velocity of the pressurized water of sewage flowing in the main, tower, aqueduct, line, or pipe. Yet when it comes to the highly pressurized flow of water from a water tower at high altitudes, the efficiency will be at the high end of the spectrum at 90% to 95%. This is also true for sewage lines that carry waste from towns and cities. The same is also true for aqueducts that carry water to large cities such as the Delaware Aqueduct that supplies water to New York City. The blades of the turbine will protrude into the main, line, or pipe through the opening cut into said main, line, tower, aqueduct or pipe which will allow the flowing water or sewage to strike the blades and cause the turbine and the turbine shaft to turn. The turbine blades will protrude into the center of the main, tower, aqueduct, line, or pipe because it is in the center that the fluid velocity is at its highest and the most kinetic energy can be captured.

Figure 3A:
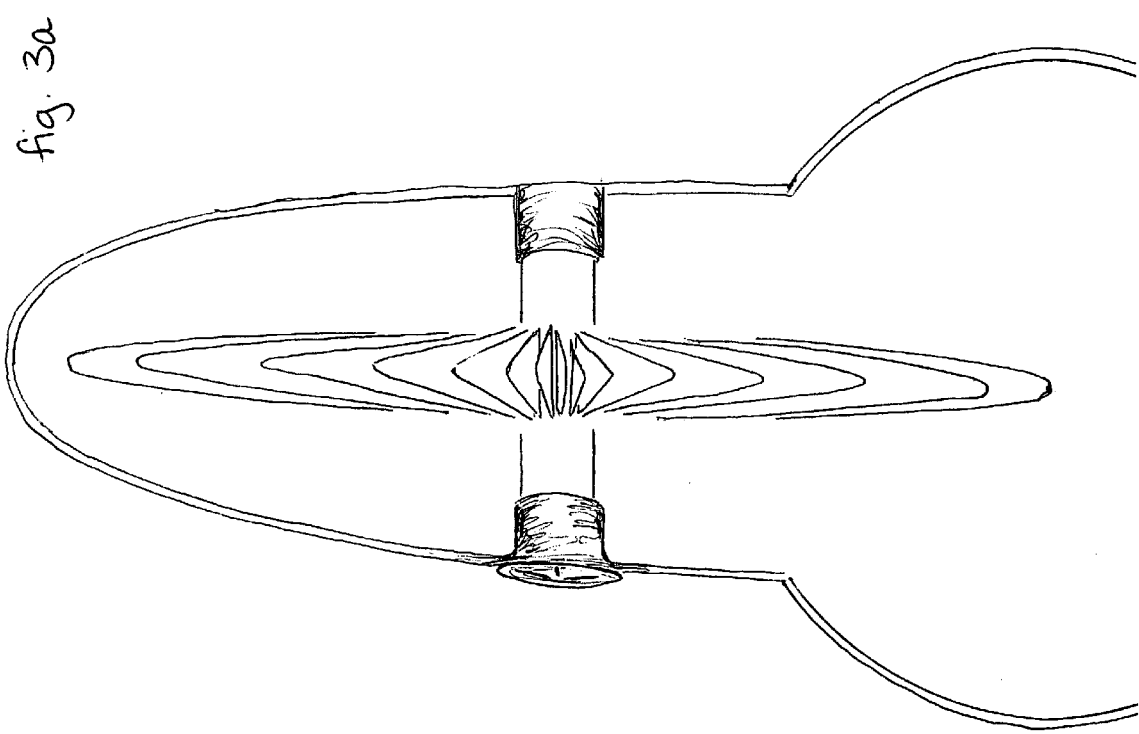
Figure 3C:
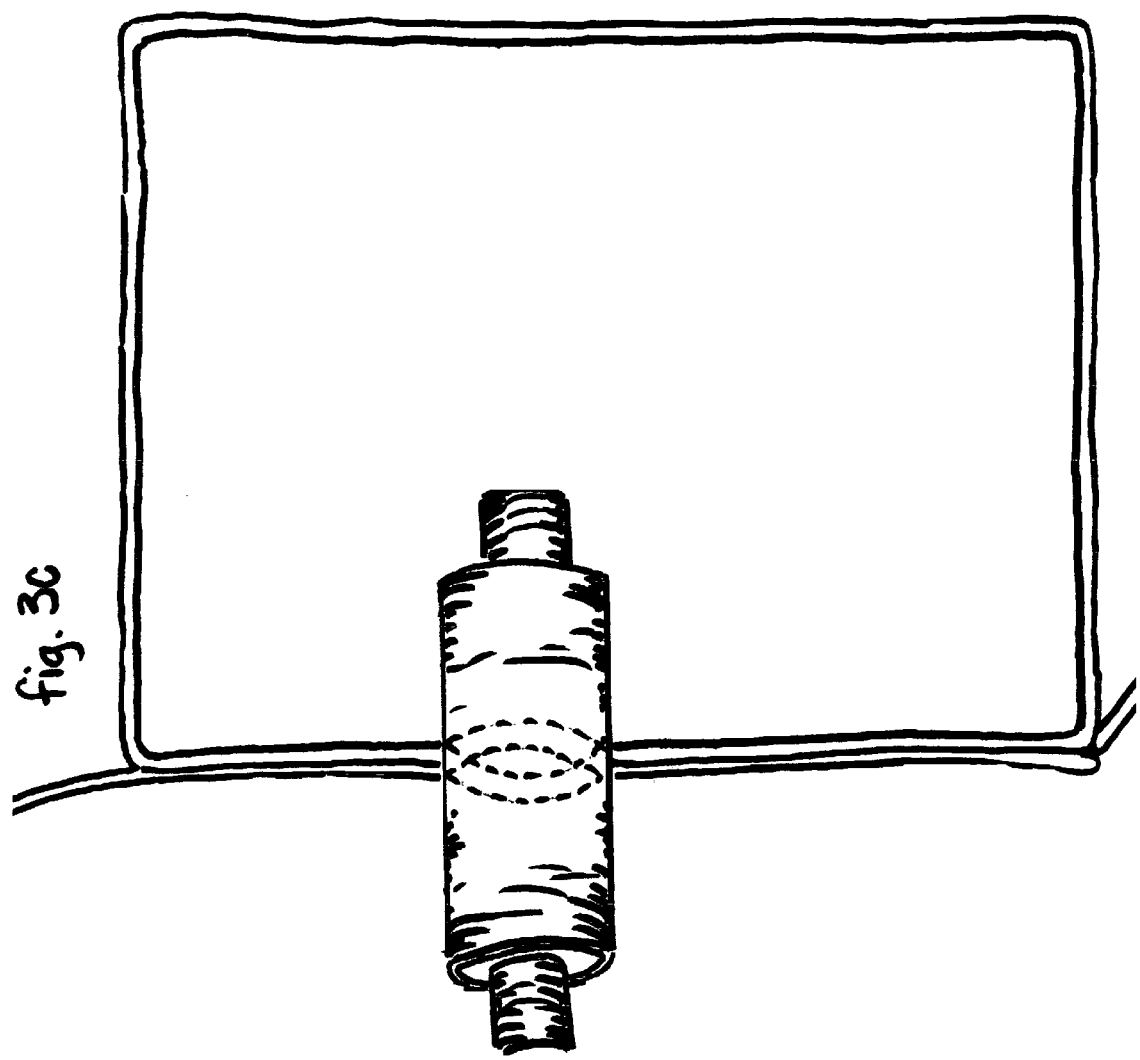
Figure 3D:
Figure 3E:
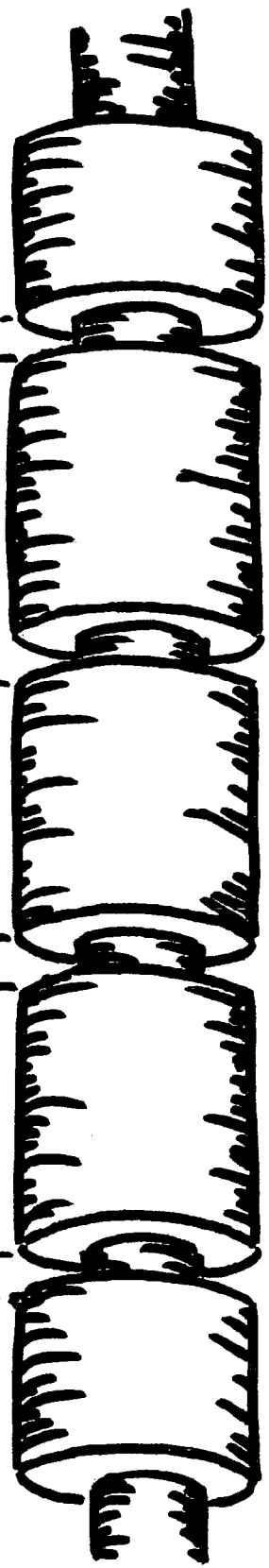

FIG. 3a shows the inside of the turbine housing with the turbine itself attached to the housing by the protrusions and the hole in the side that allows the turbine shaft to enter the generator housing. FIG. 3b shows the turbine shaft and how it fits into the center hollow part of the protrusion that supports the side of the turbine shaft that does not connect to the generator. One can see the far end of the turbine and how it resembles the head of a screw. This far end of the turbine shaft will actually be located on the outside wall of the turbine housing. FIG. 3c is an up close view of the protrusion as it fits through the hole in turbine and generator housing walls. The dotted lines represent the holes cut into each housing that are aligned perfectly and the circumference of the holes are cut so as to keep water from entering the generator housing. One can also see the turbine shaft both entering and leaving this protrusion. This is a very important part of the design. This protrusion allows the turbine shaft to enter the generator housing with no leakage of water from the turbine housing. FIG. 3d is an inside view of the protrusion that allows the turbine shaft to enter the generator housing. One can see the grooves inside this protrusion and how they align with the part of the turbine shaft that can be seen below the figure of the protrusion. This is another failsafe in terms of not allowing any water to enter the generator housing. The areas between each groove will be completely filled with the enlarged sections of the turbine shaft. FIG. 3e is a view of the turbine shaft that will be inside of the protrusion inside of the protrusion that goes through the hole and keeps water from getting inside the generator housing. There will be grooves in the turbine shaft at this point as it passes through this protrusion. The grooves will exactly match the grooves of the protrusion. The turbine shaft then enters the generator housing.

The generator housing is a box shaped apparatus that is attached to turbine housing and it houses the electric generator that will turn the captured kinetic energy from the hydraulic impulse turbine and turn it into electric energy. The turbine shaft enters generator housing by the grooved protrusion and attaches to the generator. The two housings are sealed off from one another so that water or sewage cannot get into the generator housing.

FIG. 4 shows both housings and the connection of the two housings as it pertains to the turbine shaft and the generator. The turbine blades are shown protruding into the main, tower, line, or pipe where the pressurized water or sewage flowing through said main, tower, line, or pipe will impinge upon the blades. The shape of the generator housing is shown in the depiction. One can see the turbine shaft and how it enters the generator housing and attaches to the generator. Also in the figure one can see the high voltage wires that will conduct the electric energy from the generator to the conduction pipe. There is an opening in the roof of the generator housing that allows the wire to pass through. A short tube that links the generator housing to the conduction pipe will insulate the high voltage wire until it reaches the conduction pipe.

FIG. 5 depicts what the two housings will look like before they are attached together. They are attached so as to have the hole cut in the sides of both housings aligned perfectly for the turbine shaft to enter the generator housing. Also one can see the insulated tube that carries the high voltage wires from the generator to the conduction pipe on the topside of the generator housing.

Above the underground water main, tower main, aqueduct, sewage line, or pipe there will be a pipe called the conduction pipe. For each generator housing, two high voltage wires will travel through a small insulated tube that will attach to this conduction pipe and these conduction pipes will run along the entire length of turbine and generator housings that are to be installed on water mains, tower mains, aqueducts, sewage lines, or pipes. The purpose of the conduction pipe is to get the newly created electricity to a nearby power substation so as to keep line loss at a minimum.

Figure 6A:
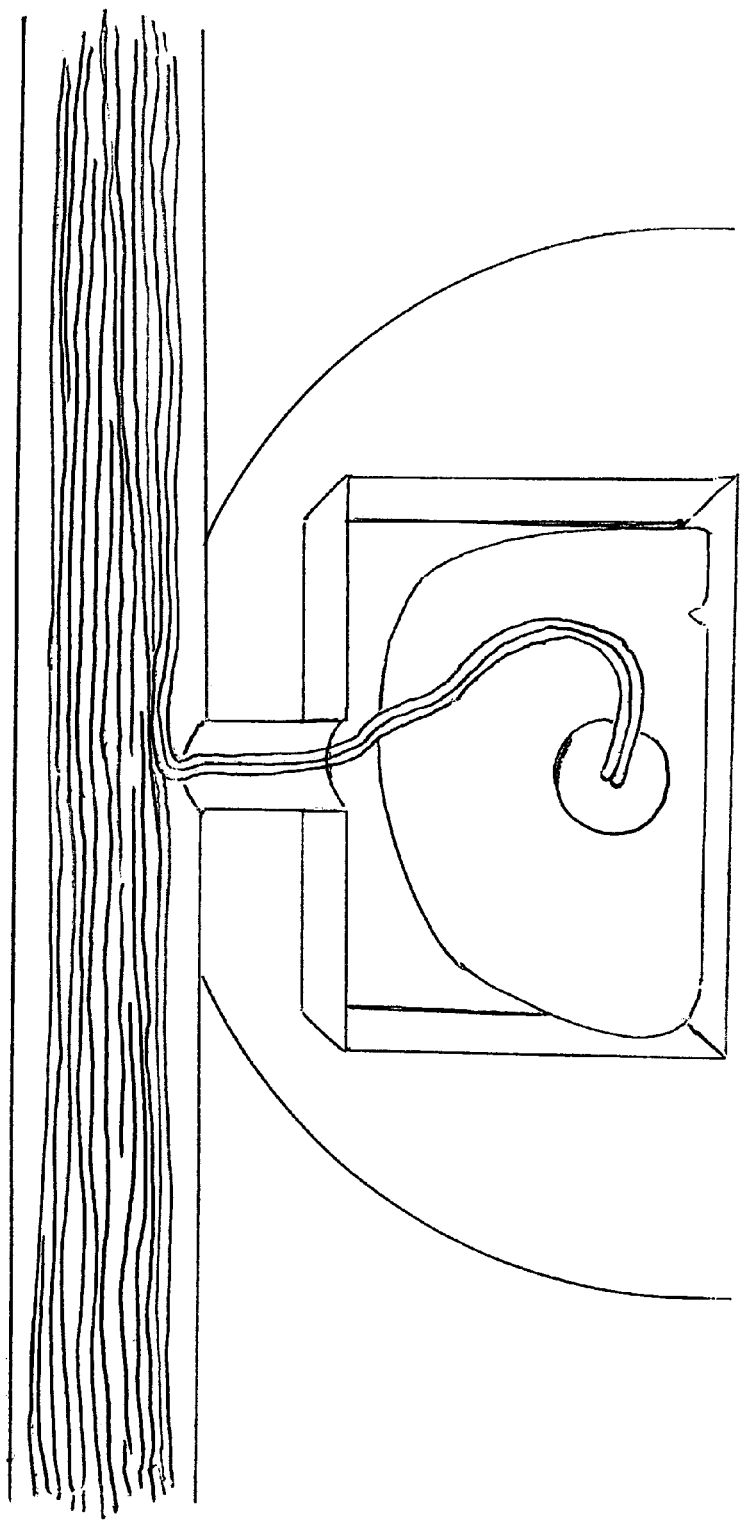
Figure 6C:
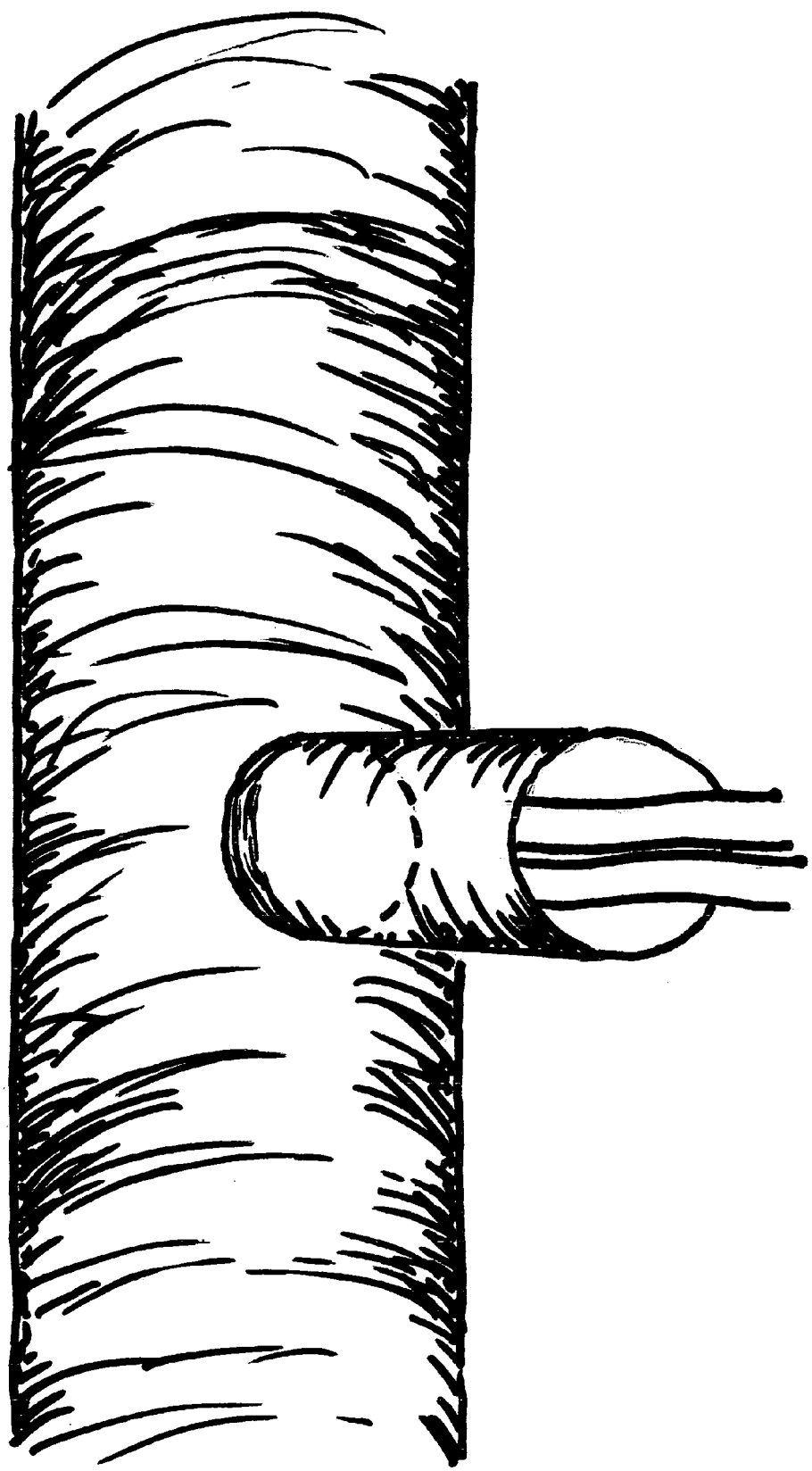

FIG. 6a shows the connection of the high voltage wires to the generator. FIG. 6b shows an up close view of the insulated tube that holds the high voltage wire and how the tube connects the generator housing to the conduction pipe. It also shows the view of the insulated tube attaching to the conduction pipe by the openings in the bottom of the conduction pipe.

Figure 7:
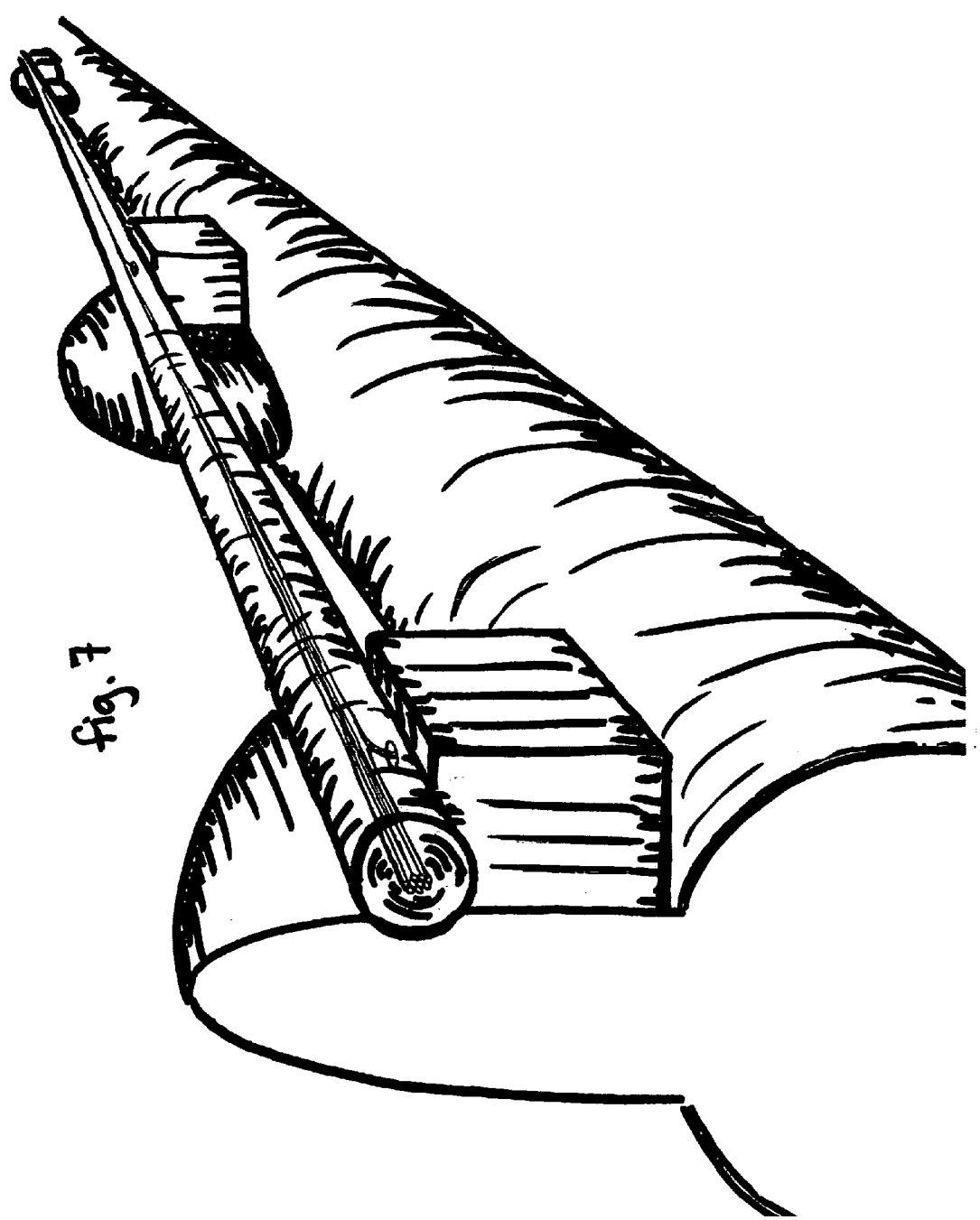
FIG. 7. This is a view of the entire schematic of the process underground. The schematic shows the main, tower, aqueduct, line, or pipe with the turbine housing and generator housing, the insulated tube that carries the high voltage wire from the generator to the conduction pipe, and the conduction pipe itself running along the main.

FIG. 7 is the process with the turbine and generator housings attached to the medium as it would look underground. One can see the conduction pipe with the high voltage wires from the many generator housings conducting the electric energy to a power substation or to a storage unit.

The turbine shaft is connected to the electric generator, and as the kinetic energy supplied by the flowing of water or sewage impinges on the blades of the turbine, electric energy can be created. The pressurized flowing of water or sewage through the pipe will cause the blades that protrude from the turbine housing into the main, tower, aqueduct, pipe, or line to turn. The kinetic energy causing the turbine to turn will make the turbine shaft turn. The turbine shaft that is attached to the generator in generator housing will cause the kinetic energy to be changed into electric energy that can then be used.

Figure 8:
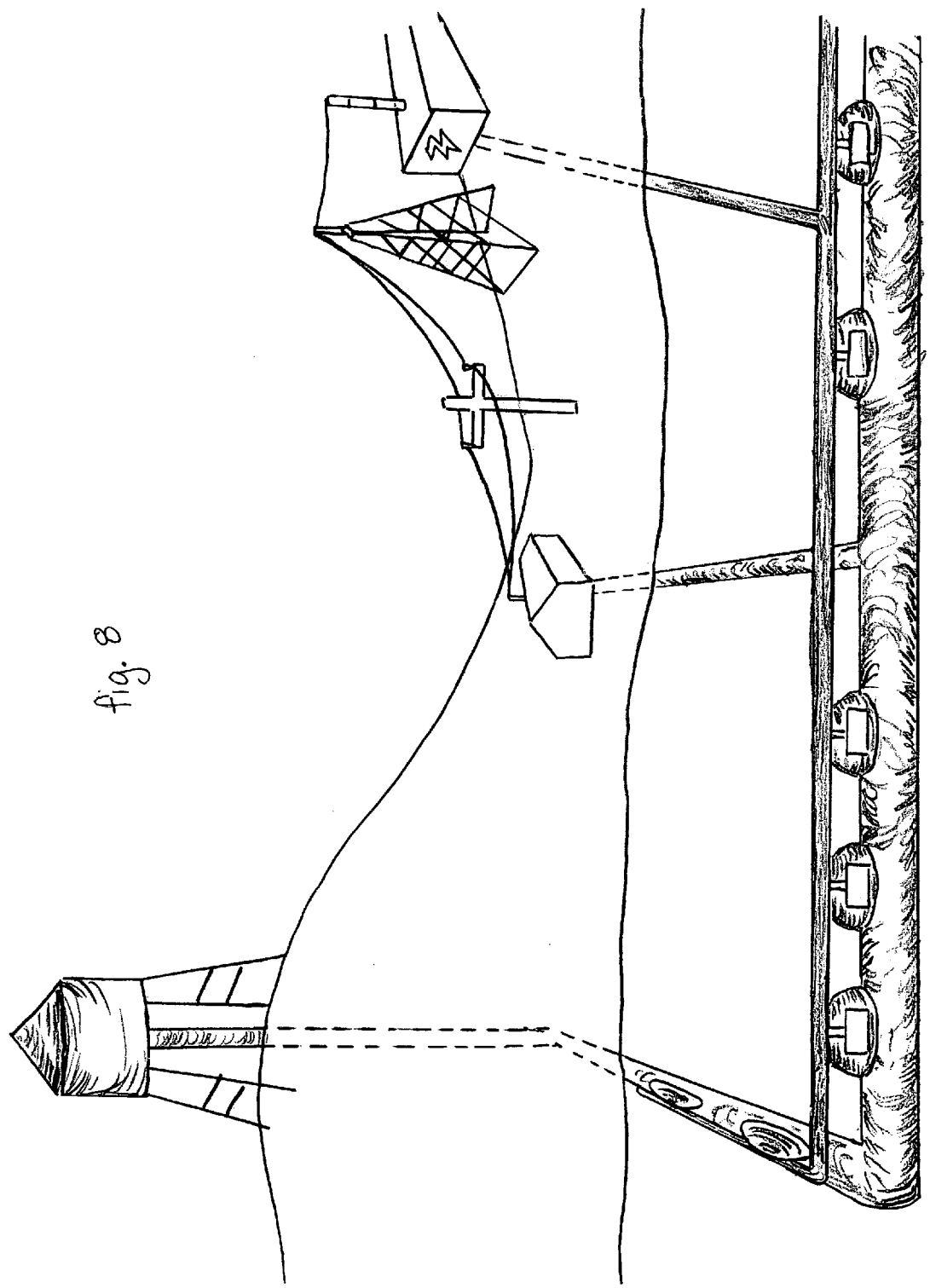
FIG. 8. This is an example of the process in terms of electricity being created by a person needing water taken to and away from their home and/or business.
Figure 1D:
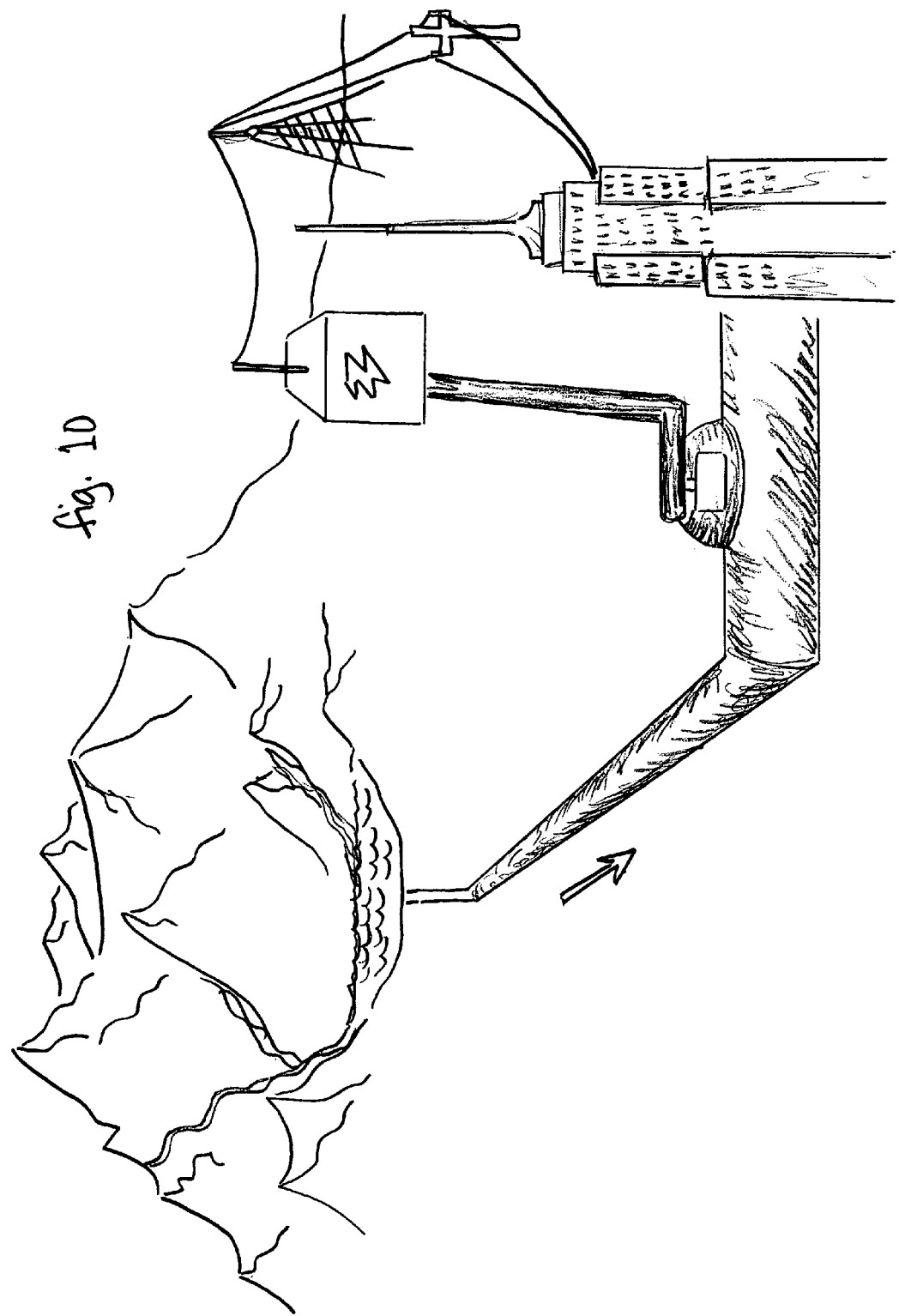

FIG. 8 shows how electricity is created by consumer demand for water in their home. The process starts at the water tower that can be seen on a ridge above the home. One can see that the turbines are attached to the side of the tube that comes out of the water tower. The turbine housings are positioned far from the top of the water tower in order for as much head and pressure to be created from the falling water. This will cause much more kinetic energy to be captured by the blades of the turbine. Near the bottom of the picture one can see the water main with more turbine housings attached and the conduction pipe following the water main. A pipe protrudes from the water main upwards to the house. The water main continues underground with other turbine housings attached to it. Towards the right side of the page one can see the conduction pipe branching off to a power substation. The electricity produced by the turbines up to this point will be conducted to this power substation where it can be sent to consumers. One can see power lines going from the power substation to the house. This depiction shows how by a person paying for and needing water in their home they are producing electricity which can then be sold back to them after it is conducted to a power substation.

FIG. 9 shows that by consumers paying to have sewage taken away from their homes and businesses they will be creating electricity. One can see a town on the left side of the page. From all of these houses and businesses a sewage line runs underneath to carry the waste created by people in the town to a nearby sewage treatment plant. One can see the sewage line running underground with turbine housings attached to it. The sewage line going to the sewage treatment plant generates electricity and when the sewage has been properly treated, it leaves the plant by a pipeline that has turbines attached to it. The conduction pipes are shown from the sewage line and the treated line running to a nearby power substation and then the substation conducting the new electricity to the homes where the sewage originated. The picture shows how by creating waste and paying to have it transported and treated; consumers will be making and purchasing their own electricity.

FIG. 10 shows an example of how to generate enormous amounts of electricity by utilizing the process on large aqueducts that provide water for large municipalities. The process is seen beginning in the mountains where the basin is located. The aqueduct carries the water in the direction that the arrow points towards all the way to the city. As the water flows through the aqueduct the water will impinge upon the blades of the turbine and the kinetic energy of the flowing water will be turned into electric energy by the generator attached to the turbine shaft. One can see the conduction pipe leading to a power substation and from this point one can see the electricity being conducted to the city by means of power lines.

The largest underground tunnel in the world is the Delaware Aqueduct that carries the water supply to New York City. It begins at the Delaware River Basin in the Catskill Mountains and 5 different reservoirs feed into the aqueduct carrying around 800 million gallons of water to New York City daily. If this process could be installed into this aqueduct system, enormous amounts of electricity could be created and with the sheer force of 800 million gallons of water flowing through the aqueduct daily, the process could possible power all of New York City and some of the surrounding areas. With over 85 miles of aqueduct and unbelievable amounts of untapped kinetic energy within the aqueduct, incidents like the recent international blackout of the Northeastern United States and Canada could be averted and clean power could be created for all to enjoy, as well as decrease the pollution that is rampant in the Northeast United States.

FIG. 11 shows how small above and below ground "conduction" installations much like the pumping stations for pressurized water can help deter line loss from the generators to the power substation. In the depiction one can see the water main with the turbine housings attached to it entering a pumping station. One can also see the conduction pipe branching off to one side where the conduction station would be located in close proximity to the water pumping station. The water main is shown leaving the pumping station after the water has been properly pressurized, as well as the conduction pipe that leaves the conduction station where the electricity has either been boosted up for traveling long distances or has been stored. When water has a long distance to travel, the pressure of the flowing water can falter greatly, making it hard for the water to reach consumers. The same can be said for the electricity being conducted from the generator housings in the process. When power substations are not nearby to some of the turbine and generator housings, small substations could be installed at intervals along the conduction pipe to boost the electricity up for more efficient conduction. These installations could even be located next to the pumping stations. These pumping stations could also become a "conduction station" in terms of electricity. At each pumping station, a storage unit of some sort, or a possible small underground substation could be installed which could either boost the electric power to help with line loss or store the electric energy. These installations would only be pertinent when the electricity would have to travel a long distance from the generator.

FIG. 12 depicts how vents on the sides of transportation routes that carry rainwater to rivers and streams could generate electricity. This is yet another way that the earth can generate its own electricity in a clean and efficient way.

Operation—FIGS. 2, 3, 4, 5, 6, 8, 9, 10, 11, and 12

The operation of the process starts with the fabrication of the turbine housing and the generator housing as well as the conduction pipe. The turbine housing is a hollow crescent shaped structure made of a strong and durable material able to withstand the pressure of flowing water. Its main function in the process is to house the turbine and keep water from leaking from the fluid medium.

Holes are cut into each wall of the turbine housing and are perfectly aligned. The purpose of these holes are to both allow the turbine shaft to enter the generator housing on one side and on the other side to allow the far end of the turbine shaft not attached to the generator to turn freely.

On the inside walls of the turbine housing are two hollow cylindrical protrusions, one that is grooved and the other that is hollow. The purpose of the protrusions is to both support turbine shaft and to not allow water to exit the turbine housing. One protrusion is attached to the side of turbine housing and the hollow middle allows the turbine shaft to turn and support it at the same time. The other protrusion that allows the turbine shaft to enter the generator housing has grooves on the inside that aid in keeping water out of the generator housing. Both of these protrusions are made of the same material as the turbine housing walls.

The turbine is installed into the housing and is supported by the two protrusions. The turbine blades are long enough to extend into the very middle of the fluid-carrying medium where the fluid velocity is greatest. The turbine blades are made of stainless steel for maximum efficiency in generation. The turbine shaft fits into the two protrusions with the far end shaped like a screw head and the section of the shaft the goes through the second grooved protrusion is grooved accordingly to fit into this protrusion. The turbine shaft then continues on into the generator housing.

When pressurized water or sewage flows through the fluid-carrying medium, the flowing fluid will impinge upon the blades of the turbine that extend into the center of the medium. The kinetic energy of the flowing pressurized fluid will cause the turbine to turn, which in turn causes the turbine shaft to turn. The protrusions will hold the turbine shaft steady, and the housing will keep water from escaping.

The generator housing is welded or attached to turbine housing wall. It is a hollow box shaped structure capable of housing a generator. It is completely sealed off from the turbine housing so as to not let any water into the generator housing. The second grooved protrusion from the turbine housing carries and supports the turbine shaft into the generator housing. The turbine shaft then connects to the generator. The turning of the shaft causes the generator to turn the kinetic energy of flowing water to electricity. There is an opening in the roof of the generator housing with a small insulated tube projecting upward. From the generator, two high voltage wires that can conduct the newly created electricity go through the hole in the roof of the generator housing, through the small insulated tube, and into the conduction pipe.

The conduction pipe serves the purpose of carrying the high voltage conduction wires from the generator to the power substation. This pipe will follow and run the entire length of the water main, water tower, sewage line, aqueduct, or pipeline where the turbines will be installed. There will be openings in the bottom of this conduction pipe that are the same circumference of the small insulated tube that extends from the generator housing. These openings will allow the two high voltage wires to enter the conduction pipe. The conduction pipe will carry the wires all the way to the power substation. At various points along the conduction pipe where the fluid-carrying medium encounters a pumping station, an optional electric storage installation can be located next to the pumping station. This unit will help keep line loss at an efficient level when just like the water or sewage, the electricity has to travel a long distance to the nearest power substation.

The operation of the process as it pertains to generating electricity by using water towers is very efficient. Water begins in the water tower that is located at a high elevation above a large group of utility consumers, mostly on top of hills or ridges. This elevation creates head and pressure on the flowing water so that it can travel long distances and allows the water to be able to enter homes and businesses that are located above ground. Turbines attached to the water tower's pipe that runs from the tower itself all the way down to the water main will generate ample amounts of electricity as the highly pressurized water strikes the blades of the turbine causing it to turn. The conduction pipe for the water tower's generators follow the tower pipe down into the ground until the tower pipe links with the various water mains. The conduction pipe can then either do one of two things. It can branch off and follow the water mains to help in the conduction of electricity generated by turbines attached to the mains. Then as the generators create electricity from the kinetic energy of the flowing fluid along the water main and water tower, the conduction pipe will carry the high voltage wires that conduct the electricity to the nearest power substation where it is then sent to consumers of electricity. Another possibility is for the conduction pipe to project to a small power substation that is constructed in close proximity to the water tower itself. The wattage that can be produced from the head of the falling water from the tower is great when a nearby power substation can greatly deter the line loss of the conducted electricity. Water towers can become small hydroelectric power stations that could supply all the electricity needed for the majority of consumers in the general area of the water tower.

The operation of the process as it pertains to the generation electricity by utilizing water mains is universal in its scope. Millions of water mains located underground carry millions and millions of purified and non-purified water at any given moment of the day. This major untapped resource of pressurized water could generate large amounts of electricity on a scale that could possibly make gas, steam, and nuclear processes of electric power generation obsolete. The water flows through the main at a high velocity in order to reach homes and businesses. With turbines attached to the topside of the water mains, the pressurized water would impinge upon the turbine blades causing the turbine shaft to turn. This kinetic energy being captured by the turbine will cause the generator to make electricity by the turning of the turbine shaft that is attached to the generator. This electricity is then conducted by high voltage wires from the generator to a nearby power substation and these wires are insulated and carried to the power substation by a conduction pipe that follows the water main. The sheer magnitude of the potential electric power generation by using turbines to capture the kinetic energy of pressurized water flowing through water mains is astounding. The endless demand for water to be taken to and taken away from homes and businesses throughout the United States will supply consumers with cleanly created electricity for generations to come.

The operation of the process when installed on sewage lines uses the unlikely untapped source of human waste to create electricity. Utility consumers pay to have sewage taken from their homes or businesses and to have it treated. When this sewage flows through the pipes that carry it away from homes and businesses, the sewage will impinge upon the blades of the turbine and cause the turbine to turn. The turbine shaft will turn as well and cause the generator to generate electricity. The electricity will then be conducted to a power substation by two high voltage wires insulated in the conduction pipe. This electricity created by demand for sewage treatment and disposal is then sold to consumers.

The operation of the process when turbines are installed on both large and small aqueducts is simple in its design, but extremely beneficial to consumers, businesses, and the world itself. Millions of gallons of water travel long distances from reservoirs to large groups of consumers daily. The pressure of this water must be great for the water to travel long distances without the aid of pumping stations. Turbines installed on these aqueducts will harness the kinetic energy of the moving water by the water impinging upon the turbine blades. Because of the magnitude of the electricity that can be created by such force acting on the turbine, these installations on large aqueducts could generate electricity much like dams can on a production scale. One of these turbine installations could produce enough power to meet the demand for towns and cities for miles around. The demand for water to transported long distances by aqueducts to fill the need for water in grossly populated areas can create electricity to fill the need for the grossly populated areas as well as the less densely populated areas that surround them.

The operation of the process as it pertains to various other types of pipelines is the same as in the other mediums above. The fluid travels through the medium and the kinetic energy of the fluid is captured by the blades of the turbine causing it to turn. The turbine shaft is attached to the generator and it causes the kinetic energy to be changed into useable electric energy that is then conducted by high voltage wires carried in a conduction pipe to the nearest power substation where it is then boosted up and sold to the consumers who pay for the use of the pipeline or various mediums.

CONCLUSION, RAMIFICATIONS, AND SCOPE OF THE INVENTION

Thus one will see that the invention of the process of attaching turbines to many different fluid carrying mediums and selling the created electricity which is created by demand for utilities back to the consumers will be beneficial to utility companies, utility consumers, the environment, and every single person who uses utilities in the United States. The main advantage of the process is the use of many different fluid-carrying mediums to generate electricity, and that people will be making their own electricity by demand for utilities that they will end up buying back from utility companies. Additional advantages are the creation of thousands of new jobs, and the possibility for American companies to take the process worldwide where there are many profits to be had in selling the use of the process. Many skilled and unskilled people will have employment coinciding with manufacturing the parts of the invention, installing the process to fluid carrying mediums, maintenance, and administrative duties. Countries around the world will want to install the turbines on their fluid carrying mediums and will either pay for the right to use the process or subcontract American companies to do the labor. Another large advantage is the fact that the population is always growing in terms of new businesses and consumers entering the utility market. More and more people are moving into new homes and apartments and having to pay for utilities. New subdivisions are being built wherever there is enough land to build them. People are starting new businesses every day and these entrepreneurs will need water and sewage taken to and away from their businesses. The demand for utilities will always be constant or growing and this means that there will be an endless supply of electricity for these consumers to purchase, which they will be making themselves!

While my above description contains many specificities, these should not be construed as limitations on the scope of the invention, but rather as an exemplification of one preferred embodiment thereof. Some variations could be possible. For example, some of the above stated fluid carrying mediums are different in size and different in the amount of electricity that they could generate. The turbines, generators, housings, and all other parts of the invention would be much larger, stronger, and durable when installed on the large aqueducts. These large underground and above ground mediums carry million gallons of water daily to large populations in cities. The entire structure would be enormous in size and in generation potential compared to the turbines that would be installed on a water main, water tower, sewage line, or pipeline. The turbine installations on these mediums would be smaller in size but greater in frequency along the entirety of the medium. The Delaware River Aqueduct is not the only aqueduct that supplies water to a large populace that the process could be utilized for. The housings could be made of many different strong materials. The shape and make of the turbine blades could be altered. The types of generators could be different. The turbines could be installed in great frequency, one right after another in short intervals along a medium. There could be a small frequency of installations along some sections of a medium. The connection of the turbine housing to the medium could be done in many ways such as welding or installing new sections of mediums with the turbine and generator apparatuses prefabricated and made into the section of the medium. The conduction pipe could be made of many different kinds of materials or metals. Alterations in the connection of the turbine and the generator and how to keep water out of the generator housing could be possible. There are many different metals that the turbine shaft and the turbine blades could be made out of. Aids in keeping line loss at a minimum other than installing "conduction" stations at various intervals or installing the turbines within a close proximity to a power substation could be possible. Other mediums besides those described in the preceding paragraphs may exist. There may be other ways to transport the high voltage wires to a power substation other than the conduction pipe. The hollow cylindrical protrusions could be altered if another design fits the purpose of supporting the turbine in a more efficient manner.

I claim:

1. A process for creating hydroelectric power that comprises: hydraulic turbines, a generator, a turbine housing, a generator housing, and a turbine shaft, said hydraulic turbines attaching to water mains or water towers or aqueducts, or sewage lines or pipes; capturing the kinetic energy of flowing water or sewage by said water or sewage striking blades of the hydraulic turbines; changing the kinetic energy into electric energy by turning said turbine shaft and generator; attaching high voltage wires to said generator that can conduct new electric energy to a conduction pipe; positioning said conduction pipe which insulates and transports the high voltage wires along the entirety of the water main or sewage line, or pipe; connecting the conduction pipe to a nearest power substation, wherein one side of the inside wall of hydraulic turbine housing has a hollow cylindrical protrusion where said turbine shaft fits into the cylindrical protrusion for support, wherein on the inside wall of the turbine housing opposite to hollow cylindrical protrusion has a hole and a second grooved protrusion with a circumference equal to said hole supporting said turbine shaft and allow said turbine shaft to enter said generator housing without any water leakage into generator housing, wherein the hydraulic turbine is housed in a crescent shaped housing which will have a base that matches the perimeter of said hole cut into the main, tower, line, or pipe and said housing will be made of the same material as the medium or a more stronger and durable material able to withstand the pressure of the flowing fluid.

2. A process in claim 1, wherein attaching said hydraulic turbine constitutes cutting a hole in said water main or water tower, or aqueduct or sewage line, or pipeline.

3. A process in claim 1 in which the housing of the hydraulic turbine is attached to the line or main, or pipe and sealed so as no pressurized fluid may escape said main or said tower or said aqueduct, or said pipe.

4. A process in claim 1, wherein attached to the outside wall of the hydraulic cylinder housing opposite the side of the hollow cylindrical protrusion will be a box shaped structure that will house a generator.

5. A process in claim 1, where in the part of the turbine shaft that passes through the second grooved protrusion will be grooved to fit into this protrusion.

6. A process in claim 1, wherein the turbine will be positioned within said housing so as to let said turbine blades protrude into the center of said main line, or aqueduct, or pipe where fluid velocity is greatest and so said blades will be impinged upon by the flowing water or sewage enabling the turbine and turbine shaft to turn.

7. A process in claim 1, wherein the second square shaped housing has a hole cut in the side facing the first hydraulic turbine housing and coinciding with the hole cut in the side of the first hydraulic turbine housing which will allow the turbine shaft to enter the second square shaped housing.

8. A process in claim 6, wherein the generator will be positioned within the generator housing so that said turbine shaft will be connected to the generator.

9. A process in claim 6, wherein two high voltage wires conduct said generated electricity from the generator to said conduction pipe and a small tube attached to the roof of the generator housing allows said wires to reach said conduction pipe.

10. A process in claim 6, wherein an opening in the roof of the generator housing will allow the insulated high voltage wire to conduct electric energy to said conduction pipe.

11. A process in claim 1, wherein many hydraulic turbine housings and generator housings is placed at intervals along the entirety of the water main or water tower or aqueduct, or sewage line, or pipe in order to capture as much kinetic energy as possible.

12. A process in claim 1, wherein a conduction pipe that will insulate and transport the high voltage wires coming from the generator will follow and run for the entire length of the main, or tower, or aqueduct, or pipe in order to allow more generators to conduct their energy to power substations.

13. A process in claim 10, wherein openings will be all along the conduction pipe that connect to the tube on the roof of the generator housing so as to allow insulated high voltage wires from the generators to connect to said conduction pipe and conduct their electricity into the conduction pipe.

14. A process in claim 11, wherein the conduction pipe will conduct all of electricity to the nearest power substation in the geographical area of the water main, water tower, aqueduct, sewage line, or pipe.

15. A process in claim 11, wherein when the high voltage wires have to travel a long distance to a power substation and line loss would be great, storage systems will be installed at adjacent water pumping stations in order to keep line loss at a minimum.

16. A process in claim 1, wherein by consumer's demand and purchasing of utilities they will be making electricity by water and sewage flowing through water mains, water towers, sewage lines, aqueducts, and pipes that carry water or sewage to and from their homes and businesses and that the electricity created by their demand for utilities is sold back to them.

* * * * *